US008615714B2

(12) United States Patent
Lewis et al.

(10) Patent No.: US 8,615,714 B2
(45) Date of Patent: Dec. 24, 2013

(54) SYSTEM AND METHOD FOR PERFORMING MULTIPLE, SIMULTANEOUS, INDEPENDENT SIMULATIONS IN A MOTION CAPTURE ENVIRONMENT

(75) Inventors: George Steven Lewis, Alvarado, TX (US); John Valentino, Hurst, TX (US); Christopher Michael Bothwell, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 293 days.

(21) Appl. No.: 12/522,620

(22) PCT Filed: Jan. 22, 2008

(86) PCT No.: PCT/US2008/051651
§ 371 (c)(1),
(2), (4) Date: Jul. 9, 2009

(87) PCT Pub. No.: WO2008/091861
PCT Pub. Date: Jul. 31, 2008

(65) Prior Publication Data
US 2010/0050094 A1 Feb. 25, 2010

Related U.S. Application Data

(60) Provisional application No. 60/886,053, filed on Jan. 22, 2007.

(51) Int. Cl.
*G06F 3/048* (2006.01)
(52) U.S. Cl.
USPC ............................................. 715/757

(58) Field of Classification Search
USPC ............................................. 715/757
See application file for complete search history.

(56) References Cited

U.S. PATENT DOCUMENTS

| | | | |
|---|---|---|---|
| 5,999,185 A | 12/1999 | Kato et al. | |
| 6,538,655 B1 | 3/2003 | Kubota | |
| 6,624,853 B1 | 9/2003 | Latypov | |
| 6,681,629 B2 | 1/2004 | Foxlin et al. | |
| 6,798,407 B1 | 9/2004 | Benman | |
| 7,084,884 B1 | 8/2006 | Nelson et al. | |

(Continued)

FOREIGN PATENT DOCUMENTS

WO 0221451 A1 3/2002

OTHER PUBLICATIONS

"Studio" defined—a compilation of various definitions of "studio" obtained from Dictionary.com, Merriam-Webster Dictionary online, and Wikipedia, on Aug. 27, 2012.*

(Continued)

*Primary Examiner* — Weilun Lo
*Assistant Examiner* — Dino Kujundzic
(74) *Attorney, Agent, or Firm* — James E. Walton; J. Oliver Williams

(57) ABSTRACT

A motion capture environment includes a plurality of sensor-trackers for tracking physical locations of a plurality of tracked objects relating to a first simulation within the motion capture environment and for tracking physical locations of a plurality of tracked objects relating to a second simulation, which is different from the first simulation, within the motion capture environment and one or more computers collectively operable to generate a first virtual reality environment corresponding to the first simulation and a second virtual reality environment corresponding to the second simulation.

15 Claims, 4 Drawing Sheets

(56) References Cited

U.S. PATENT DOCUMENTS

| | | | |
|---|---|---|---|
| 7,372,463 B2 | 5/2008 | Anand | |
| 7,468,778 B2 | 12/2008 | Thomas et al. | |
| 7,885,732 B2 | 2/2011 | Troy et al. | |
| 7,937,253 B2 | 5/2011 | Anast et al. | |
| 7,952,594 B2 | 5/2011 | Morita et al. | |
| 8,018,579 B1 | 9/2011 | Krah | |
| 8,072,479 B2 | 12/2011 | Valliath et al. | |
| 8,241,118 B2 * | 8/2012 | Camhi | 463/30 |
| 2002/0010734 A1 | 1/2002 | Ebersole et al. | |
| 2004/0080507 A1 | 4/2004 | Von Prittwitz | |
| 2004/0104935 A1 | 6/2004 | Williamson et al. | |
| 2004/0113885 A1 | 6/2004 | Genc et al. | |
| 2005/0166163 A1 | 7/2005 | Chang et al. | |
| 2005/0233865 A1 | 10/2005 | Reiffel | |
| 2006/0001650 A1 | 1/2006 | Robbins et al. | |
| 2006/0087509 A1 | 4/2006 | Ebert et al. | |
| 2006/0192852 A1 | 8/2006 | Rosenthal et al. | |
| 2006/0228101 A1 | 10/2006 | Sullivan et al. | |
| 2006/0267932 A1 | 11/2006 | Rosenberg et al. | |
| 2006/0290695 A1 | 12/2006 | Salomie et al. | |
| 2007/0003915 A1 | 1/2007 | Templeman | |
| 2011/0320567 A1 | 12/2011 | Edecker et al. | |

OTHER PUBLICATIONS

Supplementary European Search Report in Corresponding European Application No. 08713892, dated Sep. 29, 2010.
International Search Report and Written Opinion in related PCT Application PCT/US08/51651, dated Jun. 27, 2008.
International Preliminary Examination Report in related PCT Application PCT/US08/51651, dated Jul. 6, 2009, 7 pages.
International Search Report and Written Opinion in PCT Application PCT/US08/51642, dated Jun. 27, 2008, 7 pages.
International Preliminary Report on Patentability in PCT Application PCT/US08/51642, dated Dec. 29, 2008, 7 pages.
International Search Report and Written Opinion in PCT Application PCT/US08/51661, dated Jul. 1, 2008, 6 pages.
International Preliminary Report on Patentability in PCT Application PCT/US08/51661, dated Dec. 29, 2008, 7 pages.
SpotON: An Indoor 3D Location Sensing Technology Based on RF Signal Strength, by Hightower et al., University of Washington Computer Science and Engineering Technical Report #2000-02-02, Feb. 18, 2000, 16 pages.
Office Action in U.S. Appl. No. 12/522,641, dated Dec. 6, 2011, 22 pages.
International Search Report and Written Opinion in PCT Application PCT/US08/60562, dated Aug. 15, 2008, 7 pages.
International Preliminary Report on Patentability in PCT Application PCT/US08/60562, dated Feb. 18, 2010, 7 pages.
Office Action in U.S. Appl. No. 12/522,568, dated Aug. 2, 2012, 14 pages.
First Examination Report from the Canadian Intellectual Property Office in related Canadian Application No. 2,675,999, issued Jul. 5, 2012, 2 pages.
Office Action in U.S. Appl. No. 12/522,641, dated May 4, 2012, 23 pages.
Office Action in U.S. Appl. No. 12/522,641, dated Aug. 10, 2012, 24 pages
Office Action in U.S. Appl. No. 12/595,373, dated Feb. 17, 2012, 8 pages.
Office Action in U.S. Appl. No. 12/595,373, dated Aug. 15, 2012, 10 pages.
First Examination Report from the Canadian Patent Office in related Canadian application 2,675,995, mailed May 2, 2013, 4 pages.
First Examination Report from the Canadian Patent Office in related Canadian application 2,684,487, mailed Apr. 24, 2013, 3 pages.

* cited by examiner

SYSTEM AND METHOD FOR PERFORMING MULTIPLE, SIMULTANEOUS, INDEPENDENT SIMULATIONS IN A MOTION CAPTURE ENVIRONMENT

TECHNICAL FIELD

The present invention relates to simulations in a virtual environment.

DESCRIPTION OF THE PRIOR ART

Virtual reality is a technology which allows a user or "actor" to interact with a computer-simulated environment, be it a real or imagined one. Most current virtual reality environments are primarily visual experiences, displayed either on a computer screen or through special stereoscopic displays. An actor can interact with a virtual reality environment or a virtual artifact within the virtual reality environment either through the use of standard input devices, such as a keyboard and mouse, or through multimodal devices, such as a wired glove. The actor is disposed in a three-dimensional, physical space, known as a studio, wherein the actor interacts with one or more physical objects within the studio and/or with one or more virtual artifacts of the virtual reality environment.

One particular shortcoming of conventional virtual reality environments is that only one computer simulation can be conducted within a studio at any given time. Thus, if a studio is being utilized for a first simulation and the need arises to run a second, different simulation, the first simulation must be terminated in favor of the second simulation or the execution of the second simulation must be delayed until the first simulation has been completed.

There are ways of conducting virtual reality simulations well known in the art; however, considerable shortcomings remain.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
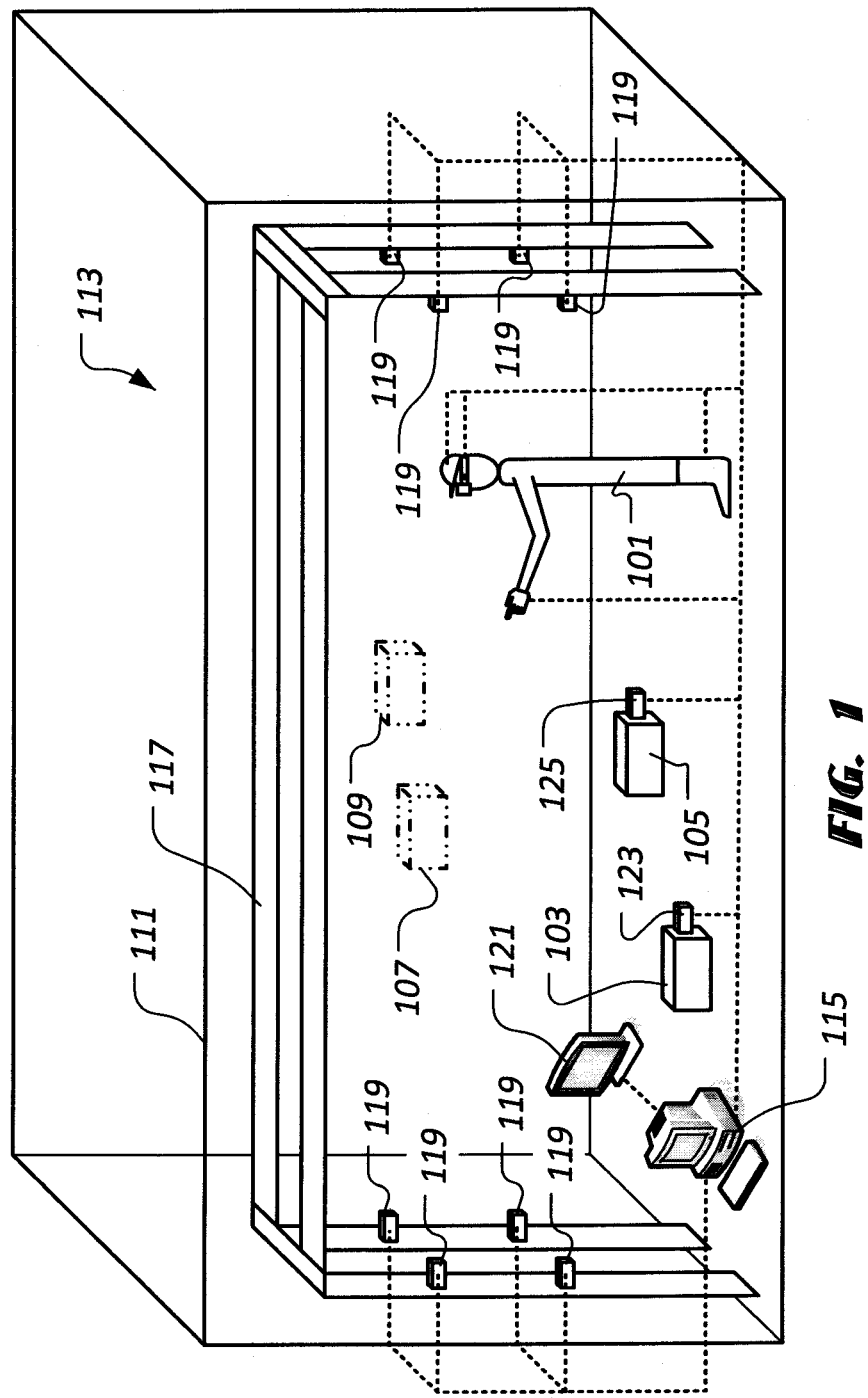
FIG. 1 is a stylized, exemplary, perspective view of an actor within a studio of a motion capture environment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1, in a virtual reality environment or virtual reality scene, one or more users or actors 101 interact with one or more physical objects 103 and/or 105 in a physical or real environment and/or one or more virtual artifacts 107 and/or 109 in the virtual reality environment. The one or more actors 101 are physically present in a three-dimensional space, known as a studio 111 in which the one or more actors 101 may move the one or more physical objects 103 and/or 105. A motion capture environment 113 is contained by studio 111. Motion capture environment 113 includes one or more computers 115 and software resident on the one or more computers 115 that are operable to generate virtual reality scenes. Motion capture environment 113 further includes a framework 117, upon which to mount tracker-sensors 119 and/or tracker-sensor combinations, which are described in greater detail herein. The software includes one or more computer programs that interpret information from the tracker-sensors and one or more computer programs that create the virtual reality scenes or environment.

A virtual representation of studio 111 exists in motion capture environment 113, which hosts the virtual reality environment. The one or more actors 101 use display devices, for example, headset viewers, such as a headset viewer 201 of FIG. 2; monitors, such as a monitor 121; or the like, to view the virtual reality environment. The virtual reality environment is the scene that the one or more actors 101, or other such observers, see via the display devices. The virtual reality environment may be a virtual representation of the studio or the virtual reality environment may be a virtual representation of any other real or imagined three-dimensional space. Moreover, the virtual reality environment may be a combination of a virtual representation of the studio and a virtual representation of another real or imagined three-dimensional space.

Figure 2:
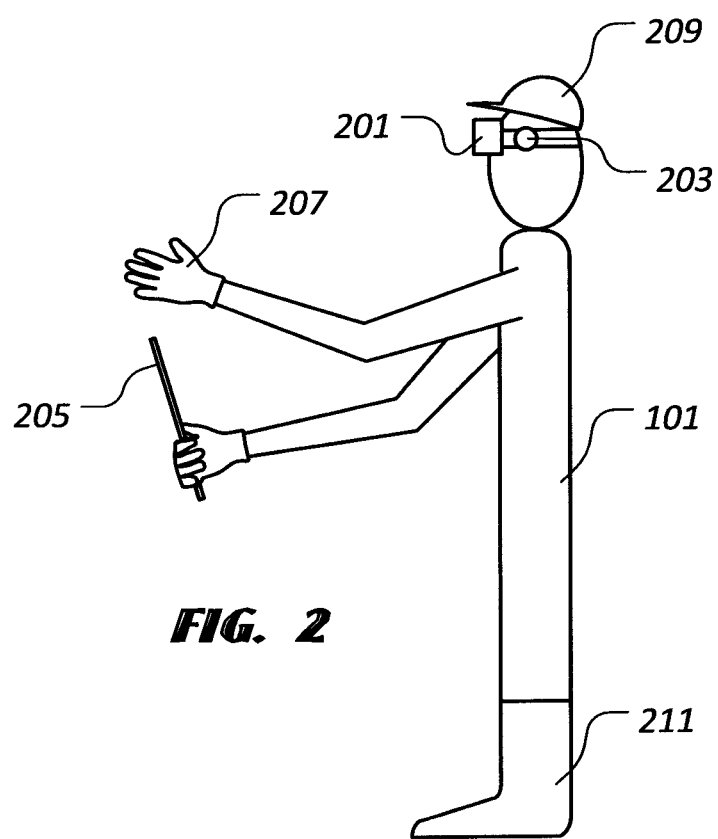
FIG. 2 is an enlarged view of the actor of FIG. 1.

Physical objects, such as physical objects 103 and 105, that are disposed within studio 111 and that are moved by the one or more actors 101, are tracked using motion capture environment 113. These "tracked objects" may be tracked by a variety of sensor methodologies, including, but not limited to, reflectors, such as reflectors 123 and 125 and reflector 203 of FIG. 2; inertial measurement units; and the like. Examples of such inertial measurement units include, but are not limited to, ring laser gyroscopes, accelerometers, ultrasonic emitter-receptors, and the like. Referring to FIG. 2, examples of tracked objects include, but are not limited to, wands, such as a wand 205; gloves, such as a glove 207; hats, such as a hat 209; head mounted displays, such as headset viewer 201; boots, such as boot 211; and the like.

Tracker-sensors, such as tracker sensors 119, interface with motion capture environment 113 and determine where a tracked object, such as physical objects 103 and 105, is located within the physical space of the studio. Such tracker-sensors may comprise a single unit or a plurality of units. The tracker-sensors may be attached to a framework, such as framework 117, which defines the physical limits of the studio or may be attached to the tracked objects, or both. While tracker-sensors may utilize various methodologies for tracking tracked objects, certain tracker-sensors use inertial acceleration with subsequent integration to provide rate and displacement information, ultrasonic measurement, optical measurement, near infrared measurement, as well as methods that use other bands of radiation within the electromagnetic spectrum.

Figure 3:
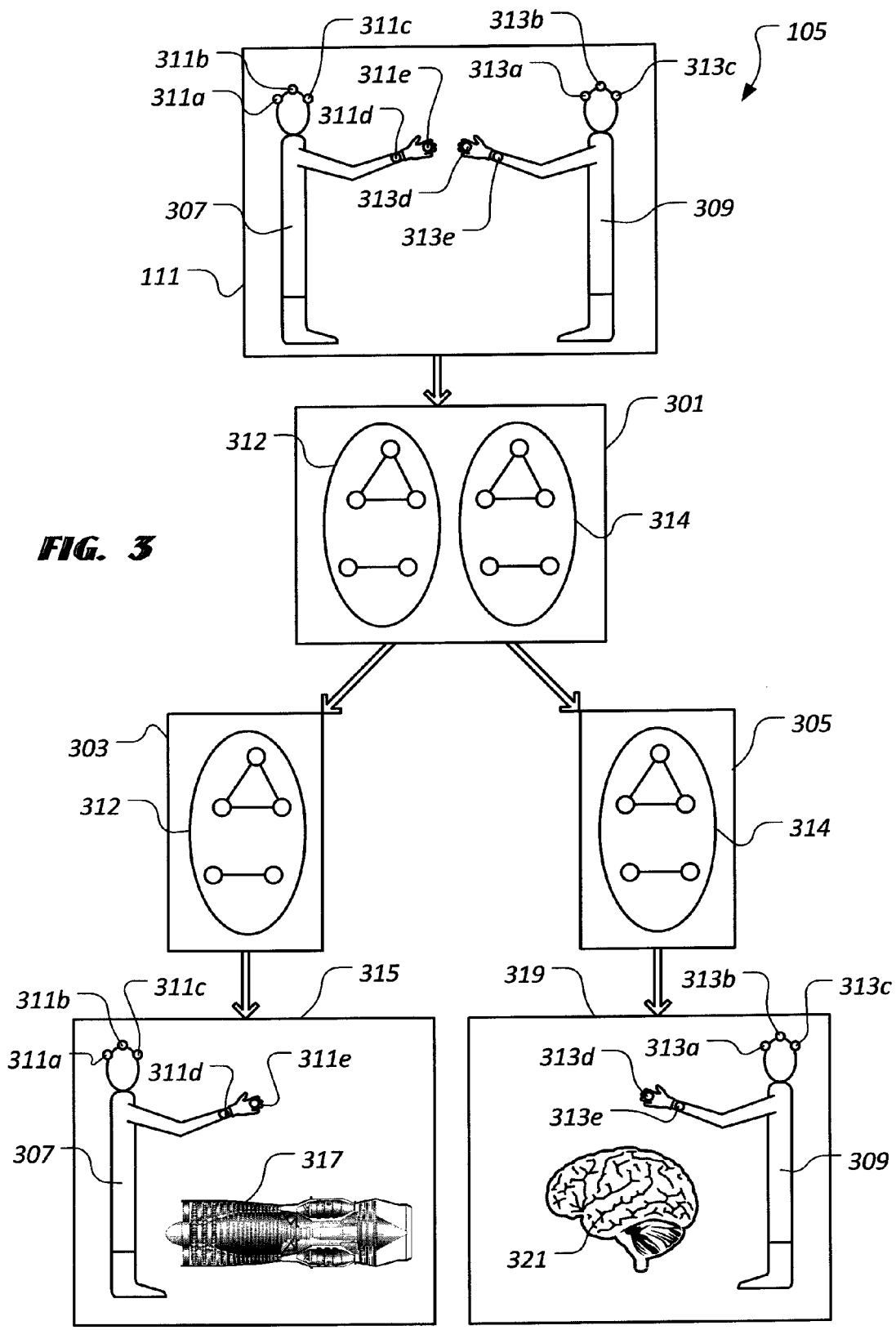
FIG. 3 is a stylized, schematic view depicting first illustrative relationships between a studio, a motion capture environment, and computer simulations performed by the motion capture environment.

Referring now to FIG. 3, the illustrated embodiment of motion capture environment 113 comprises a primary server 301; a first client 303; and a second client 305. It should be noted that any or all of the primary server, the first client, and the second client comprise one or more computers executing software embodied in one or more computer-readable media that are operable to produce and control the virtual reality environments. Clients 303 and 305 may reside on a single computer but perform separate, different computer simulations. It should be noted that while two clients 303 and 305 are depicted in FIG. 3, more than two clients are possible.

FIG. 3 depicts a first actor 307 and a second actor 309. Both actor 307 and actor 309 are disposed in a studio, such as studio 111 of FIG. 1. A first set of sensors 311*a*-311*e* are operably associated with actor 307. A second set of sensors 313*a*-313*e* are operably associated with actor 309. Tracker-sensors, such as tracker-sensors 119 of FIG. 1, determine the location of every sensor in the studio. Preferably using proximity rules, the tracker-sensors, or another element of the motion capture environment, determines which sensors are attached to, for example, a glove, such as glove 207 of FIG. 2 and to a headset viewer, such as headset viewer 201 of FIG. 2. As actors 307 and 309 move their heads and/or their hands, the proximity rules maintain the identity of the virtual hand and the virtual head of each of the actors. In this way the direction each actor 307 and 309 is looking is determined, as well as where in the studio the heads and hands of actors 307 and 309 are disposed. When more than one actor 307 and 309 is active in the studio at the same time, separate identities of the virtual hands and virtual heads of the actors 307 and 309 are maintained. In conventional motion capture environments, the locations of the hands and heads of all of the actors in the aggregate are interpreted for a single, sole, virtual reality scene or environment. The appropriate visual information for each actor is sent to the respective actor's headset. Each actor sees wherein the single virtual reality scene or environment he or she resides.

Figure 4:
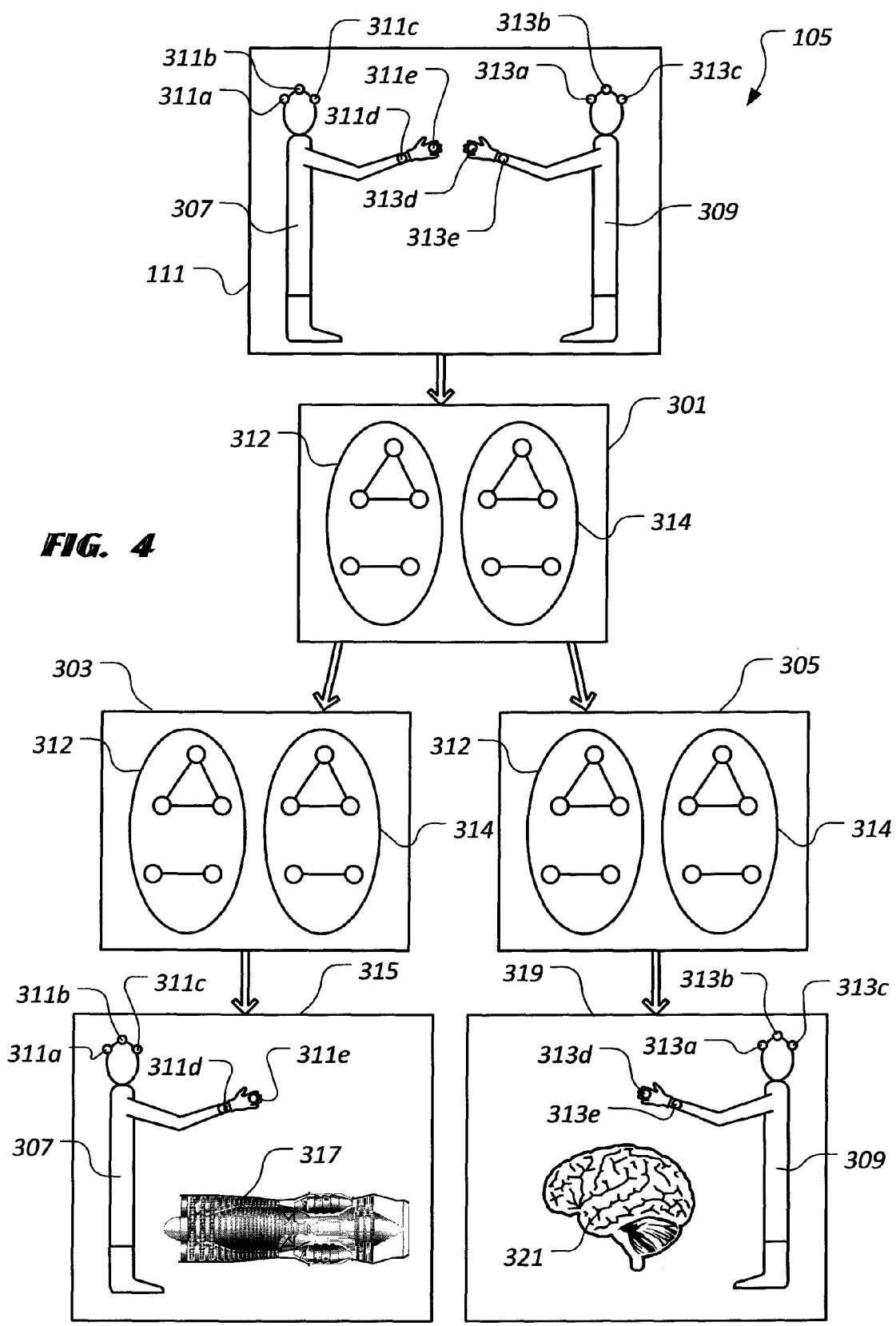
FIG. 4 is a stylized, schematic view depicting second illustrative relationships between a studio, a motion capture environment, and computer simulations performed by the motion capture environment.

In the present invention, however, the locations of all of the virtual and physical objects are sent to server 301. Server 301 sends copies of the locations of sensors 311*a*-311*e*, shown generally at 312, that are operably associated with first actor 307 to first client, 303 and sends copies of the locations of sensors 313*a*-313*e*, shown generally at 314, that are operably associated with second actor 309 to second client 305. Alternatively, the locations of all sensors 311*a*-311*e* and 313*a*-313*e* are sent to each of clients 303 and 305 along with instructions to process only those sensor locations that are part of the simulation being performed by a particular client, as shown in FIG. 4. Thus, first client 303 processes the position and orientation information of objects associated with first actor 307, while second client 305 processes the position and orientation information of objects associated with second actor 309. It should be noted that more than one actor may be associated with a particular virtual environment and that more than two computer simulations may be simultaneously conducted within a single studio. Each client performs a desired simulation. For example, first client 303 may perform a simulation 315 of a repair of an airplane engine 317, while second client 305 may perform a simulation 319 of a surgical procedure 321. Each of clients 303 and 305 determines which part or parts of the virtual reality scene to show the actor 307 or 309 assigned to that particular client and each actor 307 and 309 sees only the simulation assigned to the actor 307 or 309 in the actor's headset. Thus, the same studio can be used for very dissimilar simulations simultaneously without interference between the different simulations.

It should be noted that while the disclosure provided above describes the actors' hands and heads as being tracked, any portion of an actor's body, or any appendage to any portion of an actor's body, may be tracked.

Performing multiple simultaneous independent simulations in a single motion capture environment provides many advantages. For example, a single motion capture environment can support more than one computer simulation simultaneously, thus extending a valuable resource in the time dimension. Moreover, performing multiple simultaneous independent simulations in a single motion capture environment reduces the unit simulation cost. Furthermore, multiple, physical motion capture environments need not be built in some situations to support the demand for such environments.

It should be noted that motion capture environment 113 comprises one or more computers, such as computer 115, executing software embodied in a computer-readable medium that is operable to produce and control the virtual reality environment. The scope of the invention encompasses, among other things, motion capture environment, such as motion capture environment 113 of FIG. 1; the software operable to produce and control the virtual reality environment; and the method for producing and controlling the virtual reality environment, carried out by motion capture environment 113.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A motion capture environment, comprising:
a plurality of sensor-trackers mounted within a physical framework for tracking physical locations of a plurality of tracked objects interacting within and relating to both a first virtual reality simulation and a second virtual reality simulation within the motion capture environment, the physical framework defined by a single three-dimensional space;
one or more computers collectively operable to determine and maintain which of the plurality of tracked objects relate to the first virtual reality simulation and which of the plurality of tracked objects relate to the second virtual reality simulation, and generate a first virtual reality environment corresponding to the first virtual reality simulation and a second virtual reality environment corresponding to the second virtual reality simulation;
wherein the first virtual reality simulation is dissimilar and independent from the second virtual reality simulation, the motion capture environment performing the first virtual reality simulation and the second virtual reality simulation simultaneously within the same framework.

2. The motion capture environment, according to claim 1 wherein:
the one or more computers send the physical locations of the plurality of tracked objects relating to the first virtual reality simulation to a first client and the one or more computers send the physical locations of the plurality of tracked objects relating to the second virtual reality simulation to a second client; and
the first client performs the first virtual reality simulation and the second client performs the second virtual reality simulation.

3. The motion capture environment, according to claim 1, wherein:
the one or more computers send the physical locations of the plurality of tracked objects relating to the first virtual reality simulation and the physical locations of the plurality of tracked objects relating to the second virtual reality simulation to each of first and second clients; and
the first client performs the first virtual reality simulation and the second client performs the second virtual reality simulation.

4. The motion capture environment, according to claim 1, wherein the physical locations of the plurality of tracked objects are classified into the physical locations of the plurality of tracked objects relating to the first virtual reality simulation and the physical locations of the plurality of tracked objects relating to the second virtual reality simulation using proximity rules.

5. The motion capture environment, according to claim 1, wherein the plurality of tracked objects relating to the first virtual reality simulation relates to a first actor and the plurality of tracked objects relating to the second virtual reality simulation relates to a second actor.

6. A method for performing multiple, simultaneous, independent virtual reality simulations in a motion capture environment, the method comprising:
tracking physical locations of a plurality of tracked objects relating to a first virtual reality simulation within the motion capture environment;
tracking physical locations of a plurality of tracked objects relating to a second virtual reality simulation, the tracked objects configured to interact with both the first virtual reality environment and the second virtual reality environment, the physical locations are tracked with a plurality of sensor-trackers mounted within a physical framework defined by a single three-dimensional space;
determining and maintaining which of the plurality of tracked objects relate to the first virtual reality simulation and which of the plurality of tracked objects relate to the second virtual reality simulation;
generating a first virtual reality environment corresponding to the first virtual reality simulation; and
generating a second virtual reality environment corresponding to the second virtual reality simulation;
wherein the first virtual reality simulation is dissimilar and independent from the second virtual reality simulation, the motion capture environment performing the first virtual reality simulation and the second virtual reality simulation simultaneously within the same framework.

7. The method, according to claim 6, wherein:
generating the first virtual reality environment is accomplished by sending the physical locations of the plurality of tracked objects relating to the first virtual reality simulation to a first client, which performs the first virtual reality simulation; and
generating the second virtual reality environment is accomplished by sending the physical locations of the plurality of tracked objects relating to the second virtual reality simulation to a second client, which performs the second virtual reality simulation.

8. The method, according to claim 6, wherein:
generating the first virtual reality environment is accomplished by sending the physical locations of the plurality of tracked objects relating to the first virtual reality simulation to a first client and a second client, wherein the first client performs the first virtual reality simulation; and
generating the second virtual reality environment is accomplished by sending the physical locations of the plurality of tracked objects relating to the second virtual reality simulation to the first client and the second client, wherein the second client performs the second virtual reality simulation.

9. The method, according to claim 6, wherein tracking physical locations of a plurality of tracked objects relating to a first virtual reality simulation within the motion capture environment and tracking locations of a plurality of tracked objects relating to a second virtual reality simulation, which is different from the first virtual reality simulation, within the motion capture environment are accomplished using proximity rules.

10. The method, according to claim 6, wherein the plurality of tracked objects relating to the first virtual reality simulation relates to a first actor and the plurality of tracked objects relating to the second virtual reality simulation relates to a second actor.

11. A non-transitory computer-readable medium having software for performing multiple, simultaneous, independent simulations in a motion capture environment, when executed, the software operable to:
track physical locations of a plurality of tracked objects relating to a first virtual reality simulation within the motion capture environment;
track physical locations of a plurality of tracked objects relating to a second virtual reality simulation, the tracked objects configured to interact with both the first virtual reality environment and the second virtual reality environment, the physical locations are tracked with a plurality of sensor-trackers mounted within a physical framework defined by a single three-dimensional space;

determine and maintain which of the plurality of tracked objects relate to the first simulation and which of the plurality of tracked objects relate to the second virtual reality simulation;

generate a first virtual reality environment corresponding to the first virtual reality simulation; and generate a second virtual reality environment corresponding to the second virtual reality simulation;

wherein the computer-readable media is non-transitory; and wherein the first virtual reality simulation is dissimilar and independent from the second virtual reality simulation, the motion capture environment performing the first virtual reality simulation and the second virtual reality simulation simultaneously within the same framework.

12. The non-transitory computer-readable medium, according to claim 11, wherein the physical locations of the plurality of tracked objects relating to the first virtual reality simulation are sent to a first client and the physical locations of the plurality of tracked objects relating to the second virtual reality simulation are sent to a second client; and the first client performs the first virtual reality simulation and the second client performs the second virtual reality simulation.

13. The non-transitory computer-readable medium, according to claim 11, wherein: the physical locations of the plurality of tracked objects relating to the first virtual reality simulation and the physical locations of the plurality of tracked objects relating to the second virtual reality simulation are sent to each of first and second clients; and the first client performs the first virtual reality simulation and the second client performs the second virtual reality simulation.

14. The non-transitory computer-readable medium, according to claim 11, wherein the physical locations of the plurality of tracked objects are classified into the physical locations of the plurality of tracked objects relating to the first virtual reality simulation and the physical locations of the plurality of tracked objects relating to the second virtual reality simulation using proximity rules.

15. The non-transitory computer-readable medium, according to claim 11, wherein the plurality of tracked objects relating to the first virtual reality simulation relates to a first actor and the plurality of tracked objects relating to the second virtual reality simulation relate to a second actor.

* * * * *